(12) United States Patent
Lai et al.

(10) Patent No.: US 8,373,633 B2
(45) Date of Patent: Feb. 12, 2013

(54) MULTI-DOMAIN VERTICAL ALIGNMENT LIQUID CRYSTAL DISPLAY WITH CHARGE SHARING

(75) Inventors: Ming-Sheng Lai, Hsinchu (TW);
Hsueh-Ying Huang, Hsinchu (TW);
Chen-Kuo Yang, Hsinchu (TW);
Min-Feng Chiang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 1168 days.

(21) Appl. No.: 12/218,224

(22) Filed: Jul. 10, 2008

(65) Prior Publication Data
US 2010/0007594 A1    Jan. 14, 2010

(51) Int. Cl.
*G09G 3/36* (2006.01)
*G02F 1/136* (2006.01)

(52) U.S. Cl. ................ 345/98; 349/43; 349/48
(58) Field of Classification Search .............. None
See application file for complete search history.

(56) References Cited

U.S. PATENT DOCUMENTS

| | | | | |
|---|---|---|---|---|
| 7,248,319 | B2 | 7/2007 | Liu et al. | 349/129 |
| 2004/0178407 | A1 | 9/2004 | Lin | 257/40 |
| 2006/0164363 | A1* | 7/2006 | Battersby et al. | 345/98 |
| 2008/0019159 | A1* | 1/2008 | Song et al. | 363/62 |
| 2008/0024689 | A1* | 1/2008 | Ahn | 349/43 |
| 2009/0027581 | A1* | 1/2009 | You et al. | 349/48 |
| 2009/0135323 | A1 | 5/2009 | Yang et al. | 349/37 |

FOREIGN PATENT DOCUMENTS

| | | |
|---|---|---|
| CN | 101446723 | 6/2009 |
| JP | 2009-128900 | 6/2009 |
| WO | WO2007/136215 | 11/2007 |

OTHER PUBLICATIONS

P-119: New Multi-Domain Vertical Alignment LCD with High Contrast Ratio and Symmetrical Wide Viewing Angle Performance and Simplest Fabrication Design and Process, Hiap L. Ong, Ngwe Cheong, Jason Lo, Marty Metras, and Ollie Woodard, Kopin Corporation, Westborough, MA, USA. ISSN/0003-0966X.03.3401-0680, 2003 SID, pp. 680-683.

* cited by examiner

*Primary Examiner* — Alexander S Beck
*Assistant Examiner* — Kirk Hermann

(57) ABSTRACT

In a multi-domain vertical alignment liquid crystal display wherein a pixel that has two sub-pixels, an additional switching element is used to achieve a voltage differential between the electrode voltage potential in one sub-pixel and the other during and after the charge-sharing period. The electrodes in the sub-pixels are connected to each other through a charge-sharing capacitor and a controlling switching element, such as another transistor. Before the charge-sharing period, the controlling switching element is operated in a non-conducting state and the voltage potentials of the sub-pixel electrodes are substantially equal. During the charge-sharing period, the controlling switching element is operated in a conducting state to facilitate charge-sharing. The additional switching element is used to achieve the voltage differential more effectively and without additional capacitors.

24 Claims, 13 Drawing Sheets

MULTI-DOMAIN VERTICAL ALIGNMENT LIQUID CRYSTAL DISPLAY WITH CHARGE SHARING

FIELD OF THE INVENTION

The present invention relates generally to a liquid crystal display and, more particularly, to a multi-domain vertical alignment (MVA) liquid crystal display (LCD).

BACKGROUND OF THE INVENTION

As known in the art, a color liquid crystal display (LCD) panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2a illustrates a plan view of the pixel structure in a conventional transmissive LCD panel. As shown in FIG. 2a, a pixel 10 can be divided into three sub-pixels 12R, 12G and 12B. Three data lines 21, 22 and 23 are used to separately provide data line signals to sub-pixels 12R, 12G and 12B. The data line 24 is used to provide data line signals to the neighboring pixel column. Also, a single gate line 31 is used to activate the pixel 10. The gate line 32 is used to provide a gate line to the neighboring pixel row. It should be noted that the color sub-pixels 12R, 12G and 12B can also be arranged in a different orientation. As shown in FIG. 2b, a single data line 21 is used to provide data line signals to all three color sub-pixels 12R, 12G and 12B, and three gate lines 31, 32 and 33 are used to separately activate the color sub-pixels 12R, 12G and 12B. The data line 22 is used for providing data line signals to the neighboring pixel column and the gate line 34 is used for activating the neighboring pixel row. The pixel 10 as shown in FIG. 2a is also known as a tri-gate pixel.

In a vertical alignment (VA) liquid crystal display (LCD), the liquid crystal molecules in the display are aligned substantially along a vertical axis that is perpendicular to the substrates in the absence of an electric field. When the voltage above a certain value is applied to electrodes formed on the substrates, the molecules are aligned in a different direction, away from the vertical axis. VA-LCD has the advantages of a wider viewing angle and a higher contrast ratio than the conventional LCD.

A VA-LCD can be further improved by introducing cutouts or protrusions in each pixel so as to change the orientations of the liquid crystals into different domains. This type of VA-LCD is known as multi-domain VA-LCD or MVA-LCD. MVA-LCD further widens the viewing angle. It is known that, in an MVA-LCD display, the lateral visibility is far inferior than the frontal visibility.

In a patterned vertical alignment liquid crystal display (PVA-LCD), the lateral visibility can be improved by dividing a pixel into two sub-pixels, wherein the applied voltage in one sub-pixel is shared by the other through capacitive coupling, such that the voltages in the two sub-pixels are different. Thus, each pixel has two electrodes, as shown in the schematic presentation of FIG. 3. As shown in FIG. 3, a liquid crystal display has a first substrate, a second substrate and a liquid crystal layer disposed between the first and second substrates. In each sub-pixel 12, a common electrode, connected to a common voltage Vcom, is provided on one substrate, and two separate electrodes are located on the other substrate to provide two different vertical electric fields, at least in a time period after the pixel 12 is activated by a gate line signal. Typically, the pixel 12 is associated with a number of capacitors, such as the charge capacitance of the liquid crystal layer in the sub-pixel and various charge storage capacitors fabricated in the sub-pixels in order to maintain the voltage potential between the upper and lower electrodes after the gate line signal has passed. When the gate line signal is "on", it drives a TFT, for example, to charge up these capacitors so that the voltage level on the electrode in each sub-pixel is substantially equal to the signal on the data line, at least before the gate line signal has passed. In a PVA-LCD, the voltage potentials in the two sub-pixels after the gate line signal has passed are different. In prior art, this is achieved by using one or more capacitors for charge sharing.

SUMMARY OF INVENTION

In a color liquid crystal display (LCD), such as a multi-domain vertical alignment liquid crystal display wherein a pixel that has two sub-pixels, the present invention uses an additional switching element, such as a transistor, to achieve a voltage differential between the electrode voltage potential in one sub-pixel and that in another sub-pixel during and after the charge-sharing period. In general, the electrodes in the sub-pixels are connected to each other through a charge-sharing capacitor and a controlling switching element, such as another transistor. Before the charge-sharing period, the controlling switching element is operated in a non-conducting state and the voltage potentials of the sub-pixel electrodes are substantially equal. During the charge-sharing period, the controlling switching element is operated in a conducting state to facilitate charge-sharing. The additional switching element is used to achieve the voltage differential more effectively and without additional capacitors.

Thus, the first aspect of the present invention is a method for use in a liquid crystal display having a plurality of pixels, wherein at least some of the pixels have a first sub-pixel and a second sub-pixel, and wherein each of said pixels comprises a charge sharing period subsequent to a charging period. The method comprises:

providing a first electrode in the first sub-pixel and a second electrode in the second sub-pixel; and providing a capacitor having a first capacitor end and a second capacitor end, the first capacitor end connected to the first electrode, wherein during the charging period:
electrically connecting the first and second electrodes to a data line having data line voltage level relative to a first voltage source;
electrically connecting the second capacitor end to a second voltage source, and during the charge-sharing period:
electrically disconnecting the first and second electrodes from the data line;
electrically disconnecting the second capacitor end from the second voltage source; and
electrically connecting a second capacitor end to the second electrode, wherein the data line voltage level is provided such that a voltage potential on the first electrode relative to the first voltage source is different from a voltage potential on the second electrode relative to the first voltage source during the charge-sharing period.

In positive charging, the data line voltage level is higher than the second voltage source during the charging period such that the voltage potential on the first electrode relative to the first voltage source is higher than the voltage potential on the second electrode relative to the first voltage source during the charge-sharing period.

In negative charging, the data line voltage level is lower than the second voltage source during the charging period such that the voltage potential on the first electrode relative to the first voltage source is lower than the voltage potential on the second electrode relative to the first voltage source during the charge-sharing period.

According to one embodiment of the present invention, the first voltage source and the second voltage source are electrically connected to each other.

According to one embodiment of the present invention, the first electrode is connected to the data line via a first switching element and the second electrode is connected to the data line via a second switching element, and the second capacitor end is connected to the second voltage source via a third switching element, each of the first, second and third switching elements operable in a conducting state and in a non-conducting state, and wherein during the charging period, each of the first, second and third switching elements is operated in the conducting state, and during the charge-sharing period, each of the first, second and third switching elements is operated in the non-conducting state. The second capacitor end can be connected to the second electrode via a fourth switching element operable in a conducting state and in a non-conducting state, and wherein during the charging period, the fourth switching element is operated in the non-conducting state and during the charge-sharing period, the fourth switching element is operated in the conducting state. Each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal. Each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal. Each of the first, second, third and fourth switching elements is operated in the non-conducting state in a time period subsequent to the charge-sharing period and in a time period between the charging period and the charge-sharing period.

The present invention relates to a color LCD in which each of said pixels is one of a plurality of color-sections of a color pixel, and the color sections comprise a red, a blue and a green color section.

The second aspect of the present invention is a liquid crystal display, comprising:
a first substrate,
a second substrate; and
a liquid crystal layer, disposed between the first and second substrates, for forming a plurality of pixels, at least some of the pixels having a first sub-pixel and a second sub-pixel, wherein each of said pixels comprises a charge sharing period subsequent to a charging period, and wherein
the first sub-pixel comprises a first electrode located on the first substrate for applying a first voltage potential on the liquid crystal layer in the first sub-pixel relative to a first voltage level on the second substrate, and wherein the first electrode is electrically connected to a first end of a capacitor; and
the second sub-pixel comprises a second electrode located on the first substrate for applying a second voltage potential on the liquid crystal layer in the second sub-pixel layer relative to the first voltage level, wherein during the charging period:
the first and second electrodes are electrically connected to a data line having a data line voltage level relative to the first voltage level;
a second end of the capacitor is electrically connected to a voltage source having a second voltage level; and
during the charge-sharing period:
the first and second electrodes are electrically disconnected from the data line;
the second end of the capacitor is electrically disconnected from the voltage source; and
the second end of the capacitor is electrically connected to the second electrode, wherein the data line voltage level is provided such that the first voltage level is different from the second voltage level during the charge-sharing period.

In positive charging, the data line voltage level is higher than the second voltage source during the charging period such that the voltage potential on the first electrode relative to the first voltage source is higher than the voltage potential on the second electrode relative to the first voltage source during the charge-sharing period.

In negative charging, the data line voltage level is lower than the second voltage source during the charging period such that the voltage potential on the first electrode relative to the first voltage source is lower than the voltage potential on the second electrode relative to the first voltage source during the charge-sharing period.

According to one embodiment of the present invention, the liquid crystal display further comprises:
a first switching element for electrically connecting the first electrode to the data line;
a second switching element for electrically connecting the second electrode to the data line;
a third switching element for electrically connecting the second end of the capacitor to the voltage source, wherein each of the first, second and third switching elements is operable in a conducting state and in a non-conducting state, and wherein during the charging period, each of the first, second and third switching elements is operated in the conducting state, and during the charge-sharing period, each of the first, second and third switching elements is operated in the non-conducting state; and
a fourth switching element for electrically connecting the second end of the capacitor to the second electrode, the fourth switching operable in a conducting state and in a non-conducting state, wherein during the charging period, the fourth switching element is operated in the non-conducting state and during the charge-sharing period, the fourth switching element is operated in the conducting state. The first voltage level can be equal to the second voltage level.

According to one embodiment of the present invention, each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal. Each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal. Each of the first, second, third and fourth switching elements is adapted to operate in the non-conducting state in a time period subsequent to the charge-sharing period, and each of the first, second, third and fourth switching elements is adapted to operate in the non-conducting state in a time period between the charging period and the charge-sharing period.

The liquid crystal display is a color LCD wherein each of said pixels is one of a plurality of color-sections of a color pixel, and the color sections comprise a red, a blue and a green color section.

BRIEF DESCRIPTION OF THE DRAWINGS

FIG. 5b is an equivalent circuit of the circuit diagram of FIG. 5a.

DETAILED DESCRIPTION OF THE INVENTION

Figure 2A:
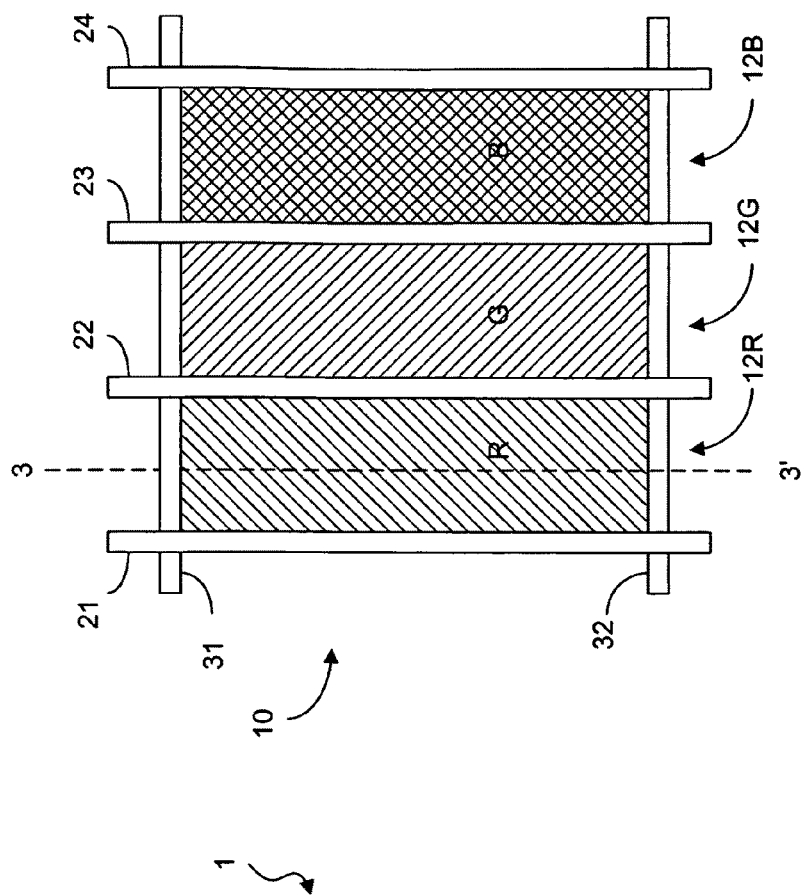
FIG. 2 is a schematic representation showing a plan view of the pixel structure in a typical LCD panel.
FIG. 2b is a schematic representation showing a plan view of the pixel structure in a LCD panel having tri-gate pixels.
Figure 1:
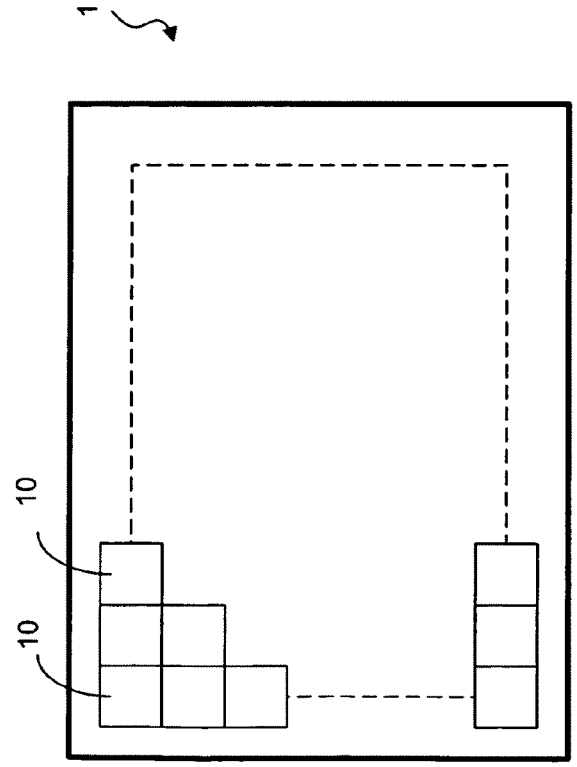
FIG. 1 is a schematic representation showing a typical LCD panel.

It is known that a color liquid crystal display (LCD) has a two-dimensional array of pixels, as shown in FIG. 1, and each pixel is divided into a plurality of color sub-pixels 12R, 12G and 12B, as shown in FIG. 2a. The major difference between different color sub-pixels is that different color filters are used to filter the transmitted light through the liquid crystal layer. The basic structure of the different color sub-pixels is substantially the same. Thus, the present invention will be described in reference to any one of the color sub-pixels 12R, 12G and 12B. For simplicity, each of the color sub-pixels is described as a pixel 12, and each of the pixel 12 is divided into two sub-pixels. The two sub-pixels have two separate electrodes for maintaining two voltage potentials in order to provide two different electric fields in the same pixel 12.

Figure 3:
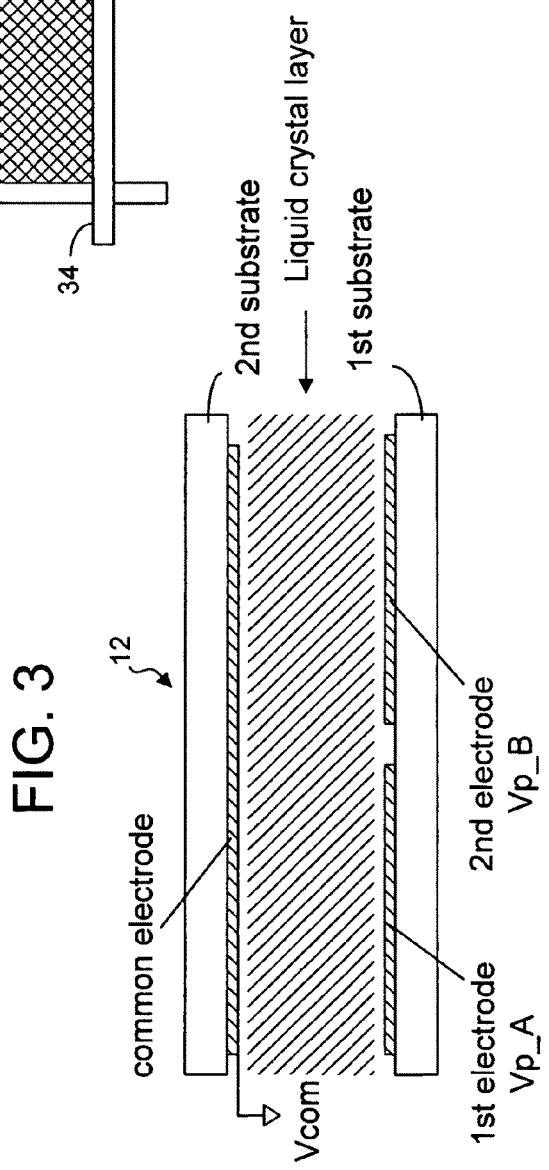
FIG. 3 is a schematic representation showing a cross sectional view of a pixel having two pair of electrodes to align the liquid crystal molecules in two sub-pixels.
Figure 4:
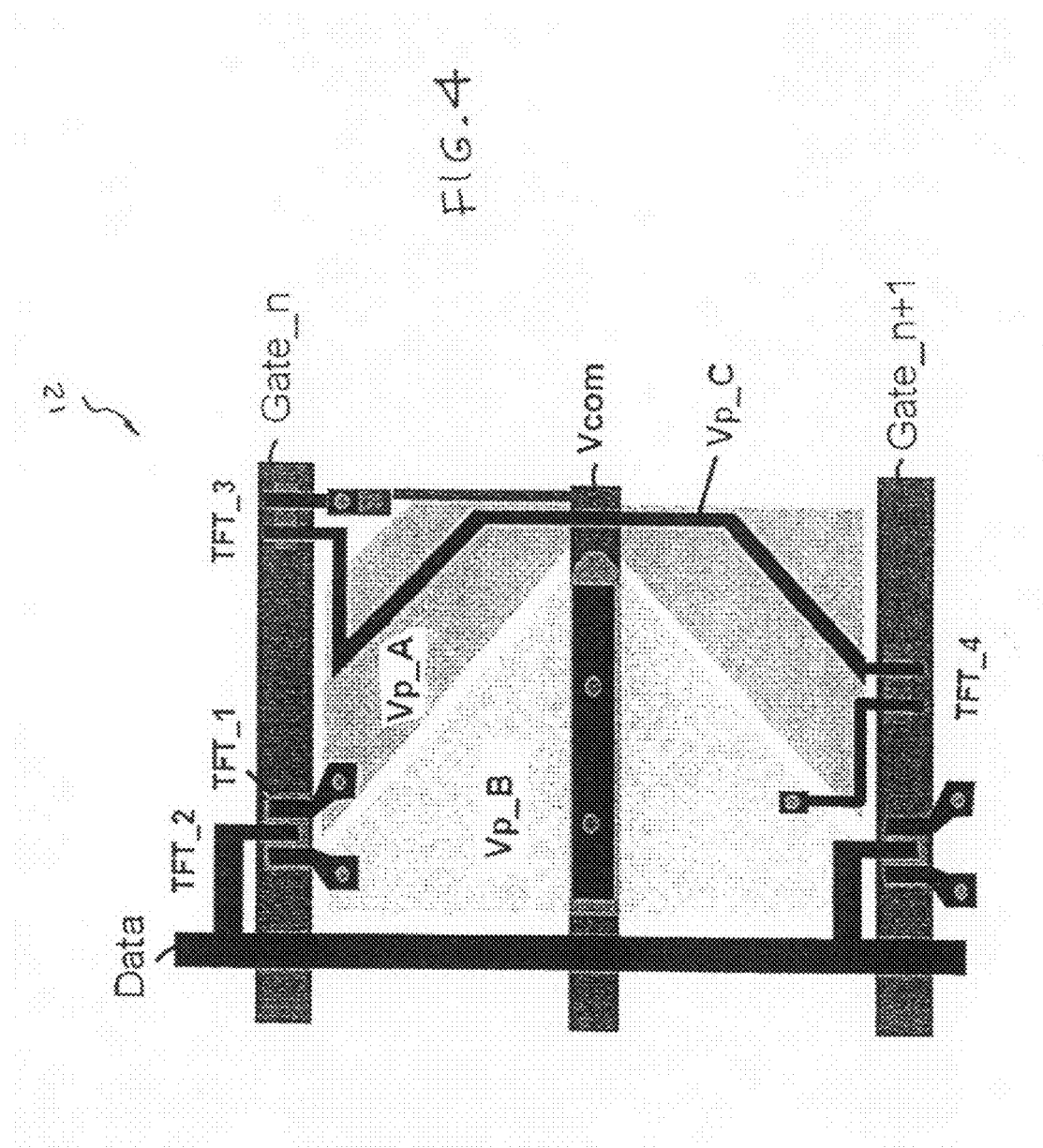
FIG. 4 shows a design layout of a pixel, according to one embodiment of the present invention.
Figure 5A:
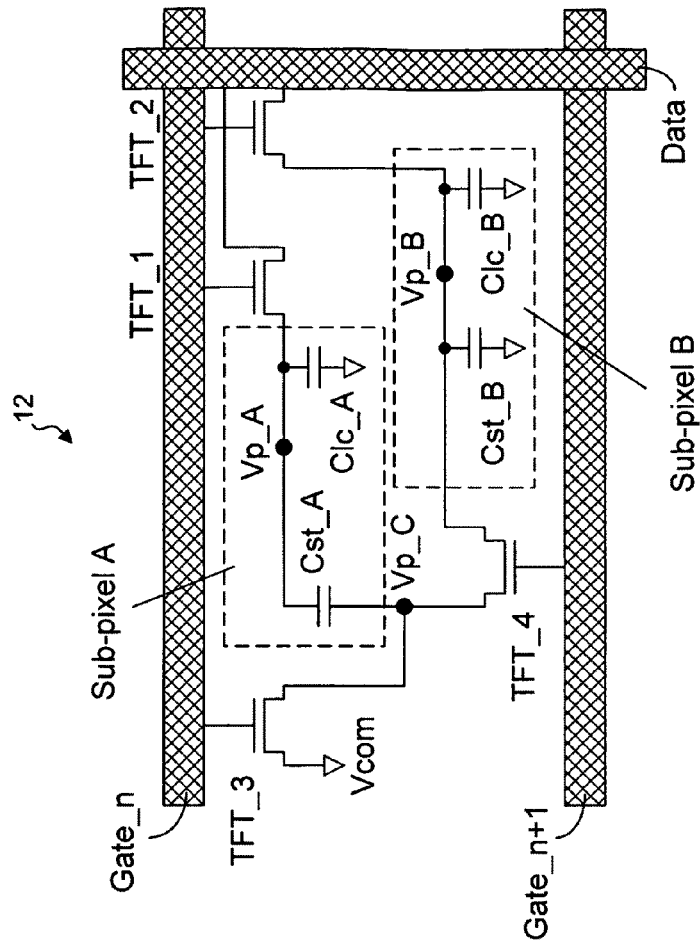
FIG. 5a is a circuit diagram of a pixel in an LCD, according to one embodiment of the present invention.

As shown in FIG. 4 and FIG. 5a, the electrode in one sub-pixel is associated with the voltage potential Vp_A, and the electrode of the other sub-pixel is associated with voltage potential Vp_B. Typically, a pixel 12 is associated with two gate lines: a gate line Gate_n and a gate line Gate_n+1, similar to gate line 31 and 32 as shown in FIG. 2a. The gate line Gate_n is used to electrically connect each of the electrodes associated with Vp_A and Vp_B to a data line (similar to data line 21 in FIG. 2a) through a switching element or thin-film transistor (TFT). In the pixel 12, according to various embodiments of the present invention, four TFTs are used as switching elements. As shown in FIG. 5a, the electrode in sub-pixel A is connected to the data line through TFT_1 and the electrode in sub-pixel B is connected to the data line though TFT_2. The sub-pixel A is associated with Clc_A, the charge capacitance of the liquid crystal layer in the sub-pixel, and Cst_A, a charge storage capacitor fabricated in the sub-pixel A in order to maintain the voltage potential between the electrode and a common voltage across the liquid crystal layer (see FIG. 3). Likewise, the sub-pixel B is associated with Clc_B, the charge capacitance of the liquid crystal layer in the sub-pixel, and Cst_B, a charge storage capacitor fabricated in the sub-pixel B in order to maintain the voltage potential between the electrode and the common voltage across the liquid crystal layer.

In the embodiment, as shown in FIG. 5a, the storage capacitor Cst_A has two ends: the first end is connected to the electrode in sub-pixel A and the second end is connected to a voltage source Vcom through the switching element TFT_3. Each of the switching elements TFT_1, TFT_2 and TFT_3 is connected to the gate line Gate_n so that when the gate line signal is "on" in the charging period, these switching elements are operated in a conducting state. As such, the voltage potential Vp_C is charged up to Vcom, the voltage potentials Vp_A and Vp_B are substantially charged up the data line voltage level during the charging period (see FIG. 6a). A fourth switching element TFT_4 is used to electrically connect the second end of the storage capacitor Cst_A to the electrode in sub-pixel B. The gate of TFT_4 is connected to the gate line Gate_n+1 so that when the gate line signal in Gate_n+1 is "on", it causes TFT_4 to operate in a conducting state during a "charge-sharing period" subsequent to the charging period (see FIG. 6a).

Figure 5B:
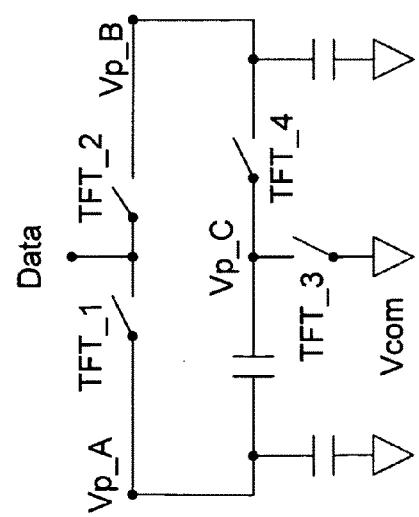
Figure 6A:
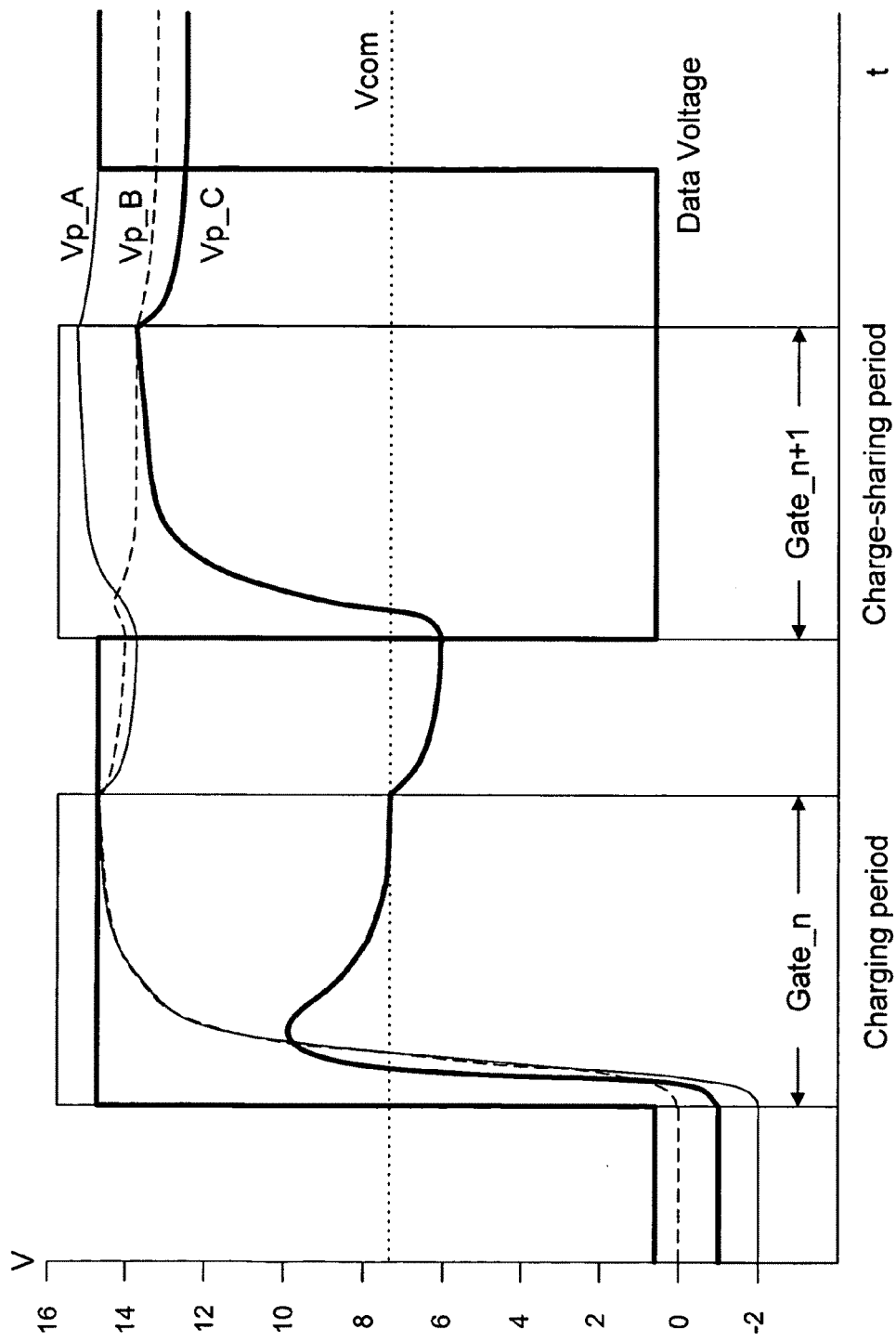
FIG. 6a shows a timing chart with various signals associated with a pixel in positive charging according to the present invention, wherein the data line driving is according to a dot inversion driving method.
Figure 7:
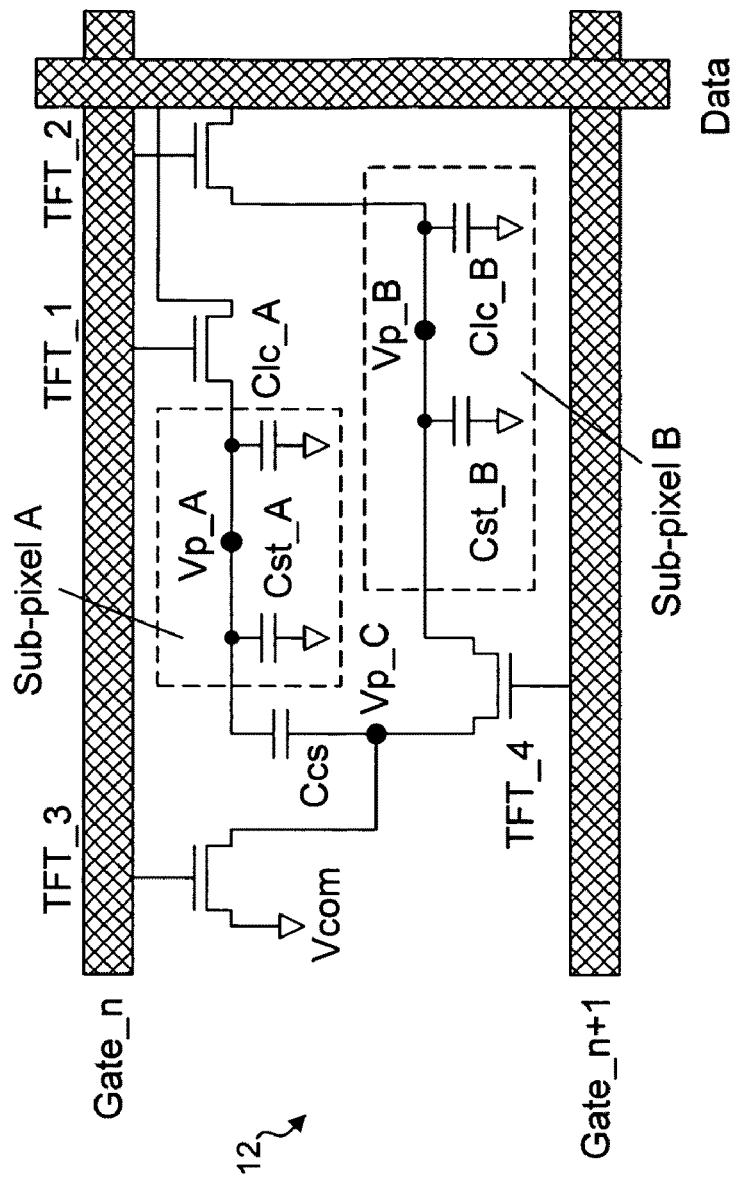
FIG. 7 is a circuit diagram of a pixel of an LCD, according to another embodiment of the present invention.
Figure 8:
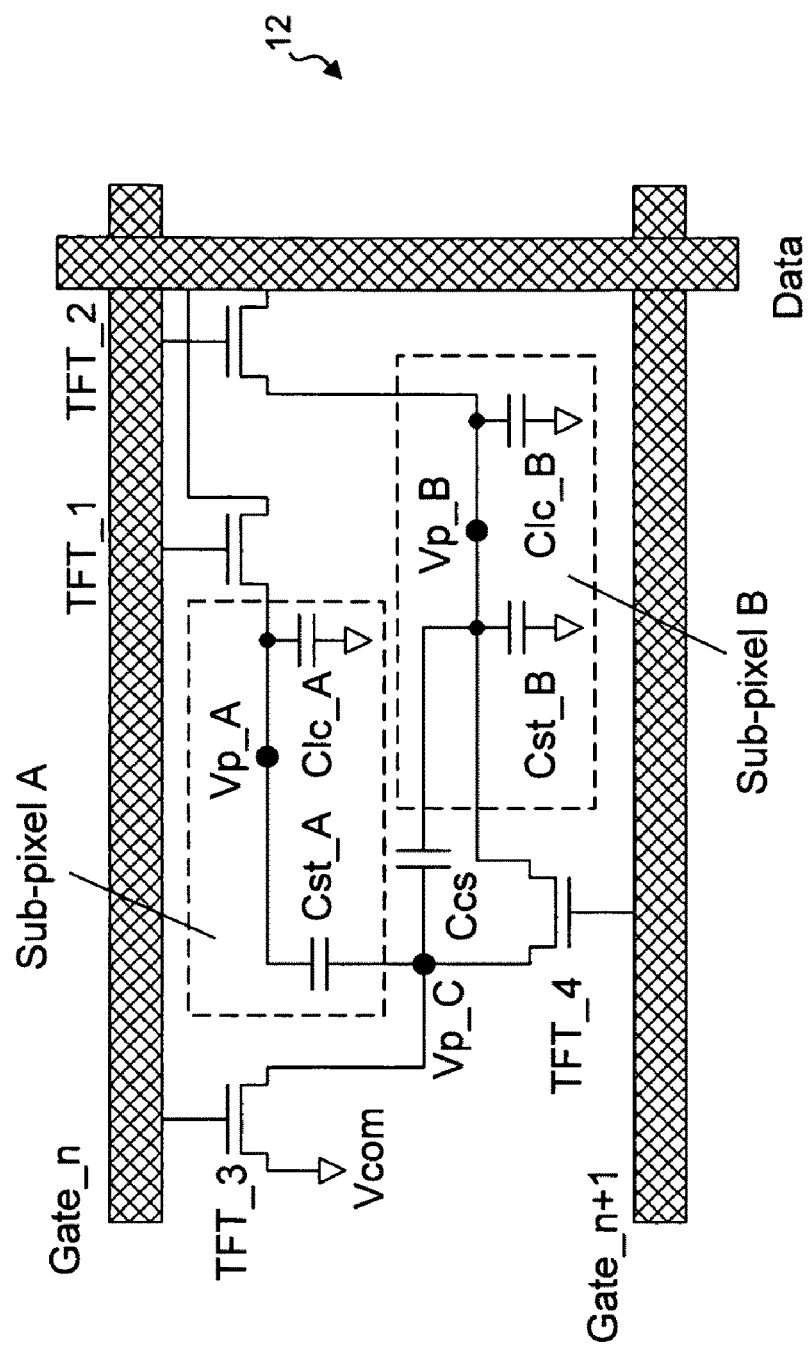
FIG. 8 is a circuit diagram of a pixel of an LCD, according to yet another embodiment of the present invention.

An equivalent circuit of the pixel structure as shown in FIG. 5a is illustrated in FIG. 5b. During the charging period or when the gate line signal in Gate_n is "on, each of the switching elements TFT_1, TFT_2 and TFT_3 is operated in a conducting state. At the end of the charging period, the voltage potential Vp_A and the voltage potential Vp_B are substantially equal to the voltage level of the data line signal, and the voltage level Vp_C is substantially equal to Vcom (see FIG. 6a). After the gate line signal in Gate_n has passed, each of the switching elements TFT_1, TFT_2 and TFT_3 is operated in a non-conducting state. Because of the storage and liquid crystal capacitance Cst_A, Cst_B, Clc_A and Clc_B, the voltage potentials Vp_A, Vp_B and Vp_C are only slightly lowered due to discharge. Nevertheless, Vp_B is substantially higher than Vp_C. During the charge-sharing period as TFT_4 is operated in the conducting state, Vp_B decreases and becomes equal to Vp_C. At the same time, Vp_A increases because Vp_C is now higher than Vcom. As a result, Vp_A, the voltage potential in sub-pixel A is higher than Vp_B, the voltage potential in sub-pixel B. This voltage potential difference is substantially maintaining after the gate line signal Gate_n+1 has passed. As such, the vertical electric field in sub-pixel A is higher than the vertical electric field in sub-pixel B. Accordingly, liquid crystal molecules in the same pixels can be aligned differently in different domains, thereby improving the color quality of the liquid crystal display. It should be noted that one end of each of the capacitance Clc_A, Clc_B and the capacitor Cst_B (see FIG. 5b) is generally connected to Vcom on the second substrate as shown on FIG. 3. In one embodiment of the present invention, the same Vcom is also connected to TFT_3 (the drain terminal, for example) as shown in FIGS. 5A, 7 and 8. As such, the voltage Vp_C near the end of the charging period is substantially equal to Vcom as shown in FIG. 6a. In a different embodiment of the present invention, the DC voltage source that is connected to TFT_3 is different from Vcom and the DC voltage source can be provided on the first substrate or the second substrate. For example, the DC voltage can be lower or higher than Vcom. The drain voltage on TFT_3 can be optimized in order to balance the voltage differential (Vp_A−Vp_B) between positive frame and negative frame.

Figure 6B:
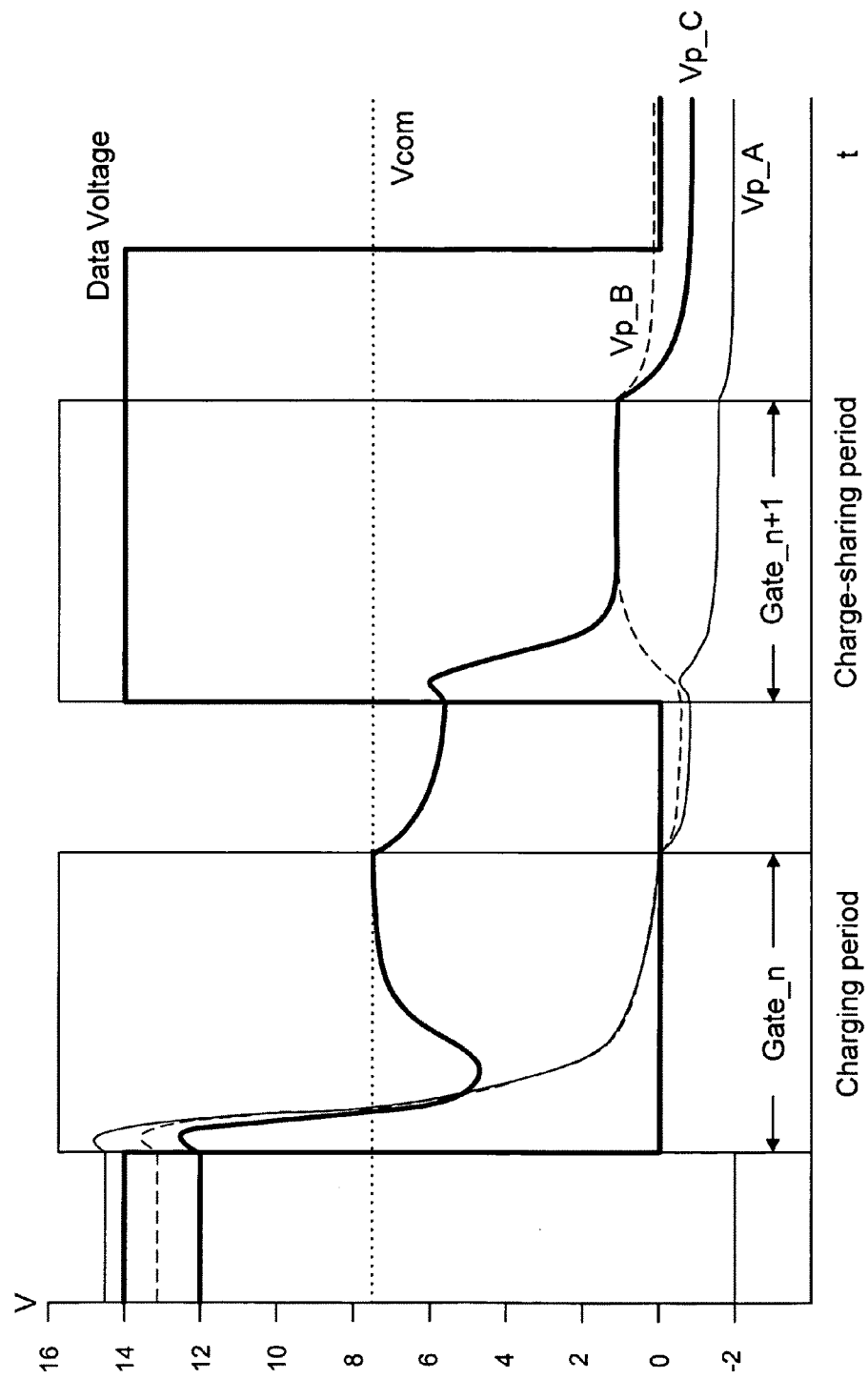
FIG. 6b shows a timing chart with various signals associated with a pixel in a negative charging, wherein the data line driving is according to a dot inversion driving method.

In the timing chart as shown in FIG. 6a, the data voltage, or the voltage level of the data line, is higher than Vcom during the charging period (positive charging), but it is lower than Vcom in the charge sharing period. Thus, in the positive charging period, Data voltage=Vp_A=Vp_B>Vp_C=Vcom In the charge-sharing period, Vp_A>Vp_B=Vp_C>Vcom It should be noted that, the present invention is also applicable in negative charging. In negative charging, the data voltage is lower than Vcom during the charging period, but it is higher than Vcom in the charge sharing period, as shown in FIG. 6b. Thus, in the negative charging period, Data voltage=Vp_A=Vp_B<Vp_C=Vcom In the charge-sharing period, Vp_A<Vp_B=Vp_C<Vcom FIGS. 7 and 8 show different embodiments of the present invention. In the embodiment as shown in FIG. 7, a capacitor Ccs, instead of Cst_A, is used for charge-sharing between sub-pixel A and sub-pixel B. Thus, the first end of capacitor Ccs is electrically connected to the electrode in sub-pixel A. The second end of capacitor Ccs is connected to Vcom via TFT_3 and to the electrode in sub-pixel B via TFT_4. The operation principle of the pixel structure in this embodiment is similar to that in the embodiment as shown in FIG. 5a.

In the embodiment as shown in FIG. 8, an additional capacitor Ccs is connected by Vp_C and Vp_B.

FIG. 9 shows an exemplary design layout of a color pixel similar to any one of color pixels 12R, 12G and 12B in FIG. 2a. In FIG. 9, Gate_n and Gate_n+1 are equivalent to the gate lines 31 and 32 in FIG. 2a. The data line Data is connected to the electrodes for Vp_A and Vp_B via TFT_1 and TFT_2, respectively. The electrically conducting patch for Vp_C is connected to the electrode for Vp_B via TFT_4 and is connected to Vcom via TFT_3. Data+1 is a data line for the neighboring color pixel.

Figure 2B:
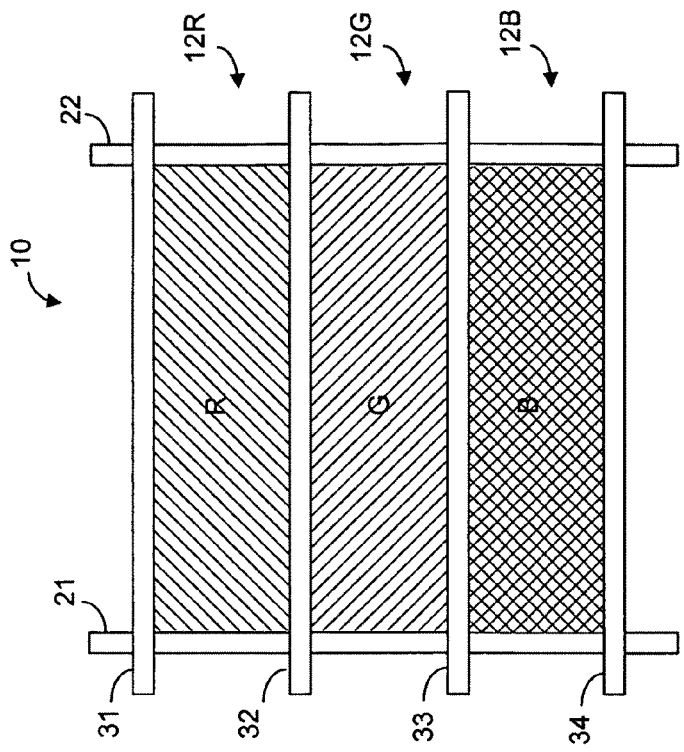

The present invention can also be used in a liquid crystal display having an array of tri-gate pixels as shown in FIG. 2b. FIG. 10 shows an exemplary design layout of a color pixel similar to any one of color pixels 12R, 12G and 12B in FIG. 2b. In FIG. 10, Data and Data+1 are equivalent to the data lines 21 and 22 in FIG. 2b. Data is connected to the electrodes for Vp_A and Vp_B via TFT_1 and TFT_2, respectively. Data+1 is a data line for the neighboring color pixel. If the color pixel 12 as shown in FIG. 10 is equivalent to the sub-color pixel 12R as shown in FIG. 2b, then Gate_n, Gate_n+1 and Gate_n+2 are equivalent to the gate lines 31, 32 and 33 in FIG. 2b.

In a prior art PVA-LCD, an additional capacitor connected between Vp_C and Vcom is used for charge-sharing between Vp_A and Vp_B during the charge-sharing period. This additional capacitor occupies part of the area of the color pixel 12, thereby reducing the aperture ratio of the color pixel. Furthermore, the voltage potential Vp_C is always higher than Vcom at the end of the charging period. In contrast, according to various embodiments of the present invention, the voltage potential Vp_C is substantially equal to Vcom at the end of the charging period. Accordingly, before charge-sharing, the voltage potential difference between Vp_B and Vp_C in a prior art PVA-LCD is smaller than the voltage potential difference between Vp_B and Vp_C, according to various embodiments of the present invention. Consequently, after charge-sharing, the voltage potential difference between Vp_A and Vp_B in a prior art PVA-LCD is also smaller than the voltage potential difference between Vp_A and Vp_B, according to various embodiment of the present invention. For the above reasons, the color quality of a liquid crystal display, according to the charge-sharing approach of the present invention, is substantially improved.

Figure 9A:
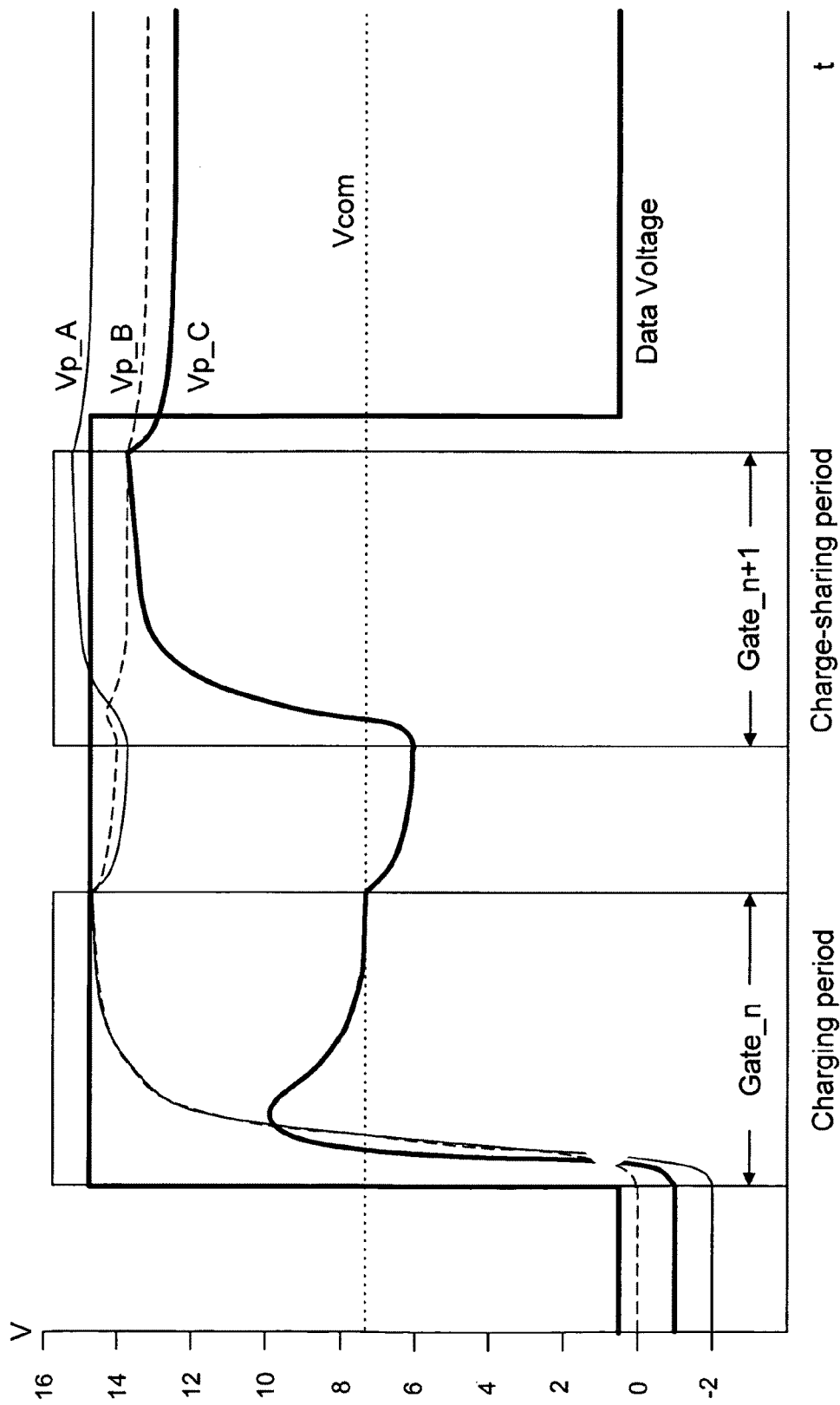
FIG. 9a shows a timing chart with various signals associated with a pixel in positive charging according to the present invention, wherein the data line driving is according to a 2-line inversion driving method.
Figure 9B:
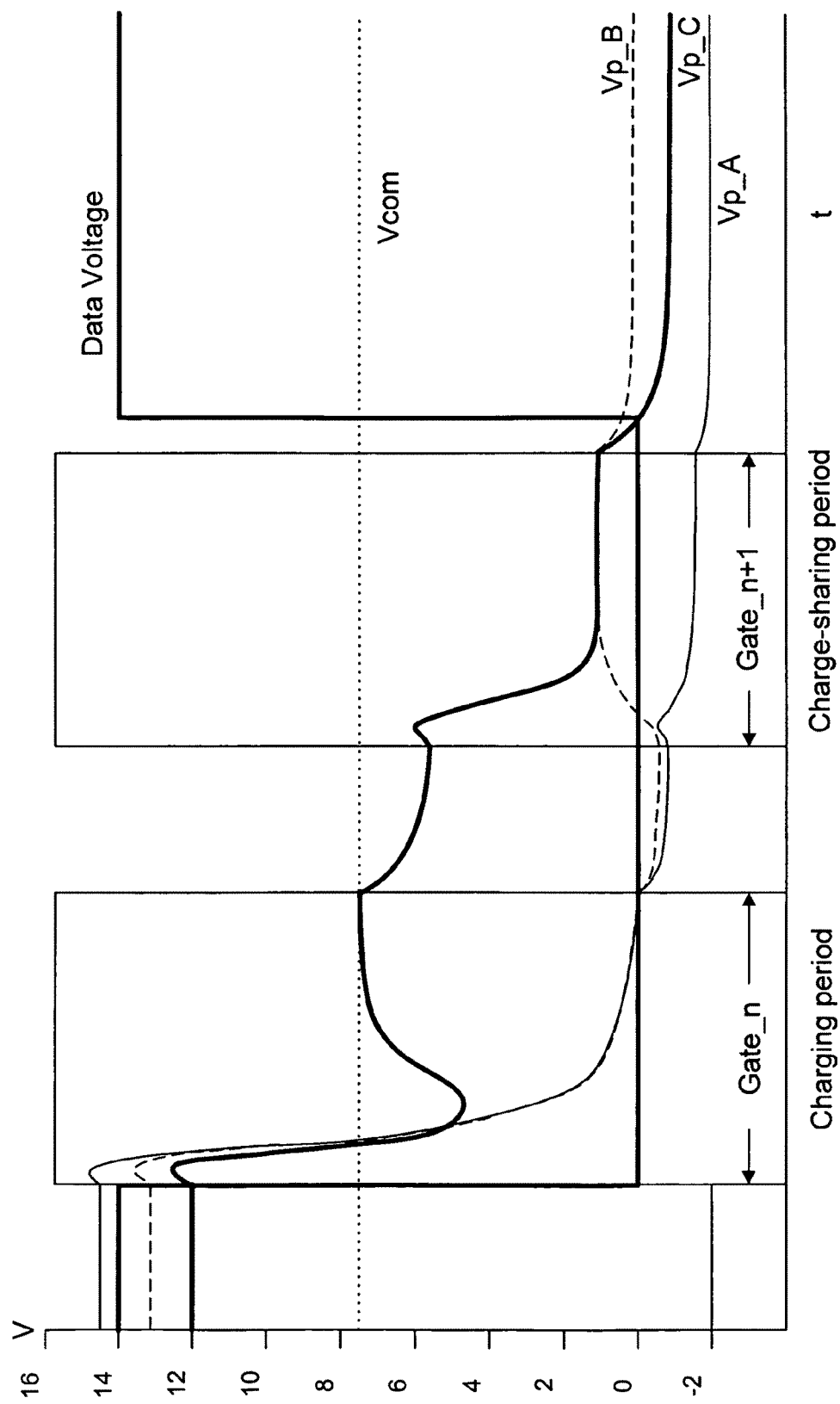
FIG. 9b shows a timing chart with various signals associated with a pixel in a negative charging, wherein the data line driving is according to a 2-line inversion driving method.
Figure 10A:
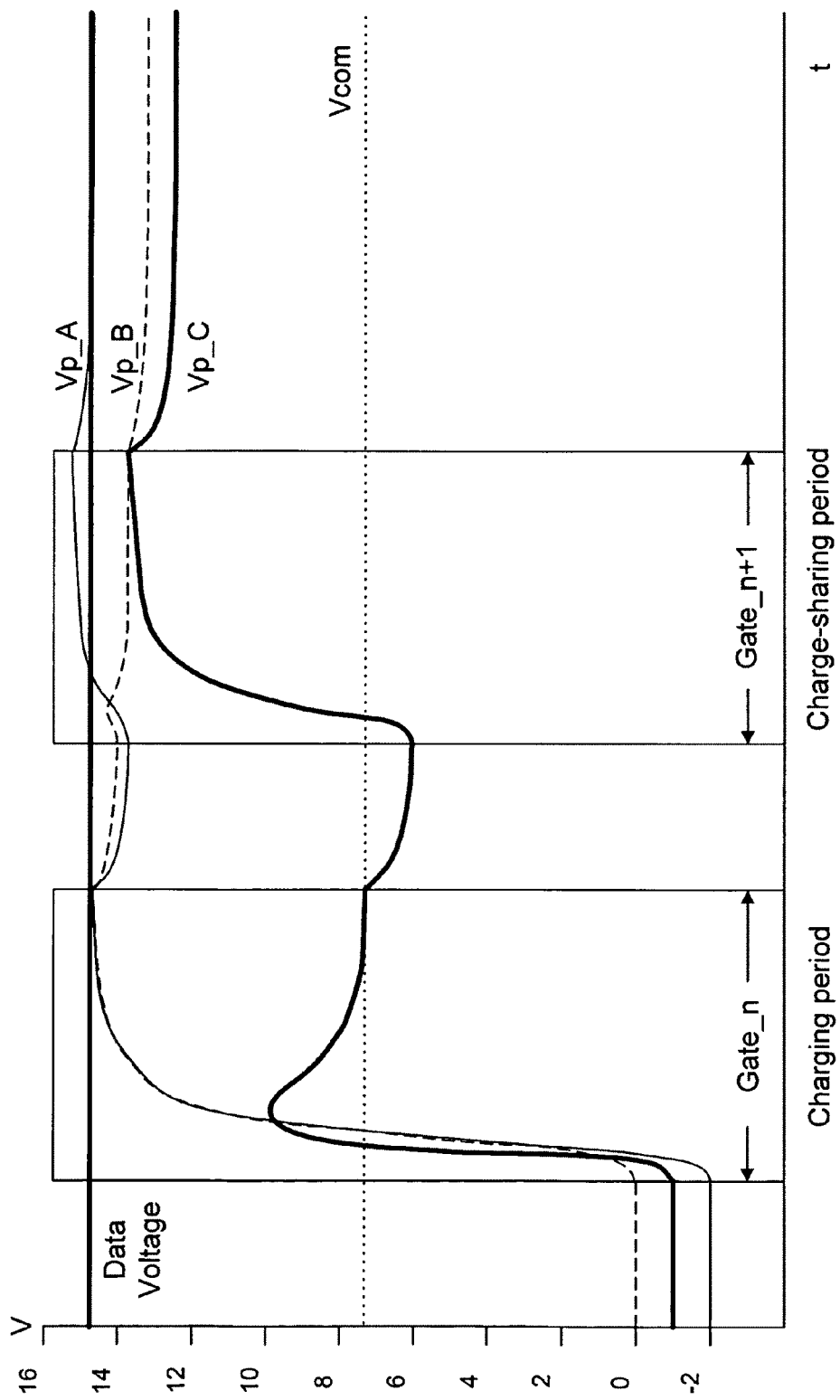
FIG. 10a shows a timing chart with various signals associated with a pixel in positive charging according to the present invention, wherein the data line driving is according to a column inversion driving method.
Figure 10B:
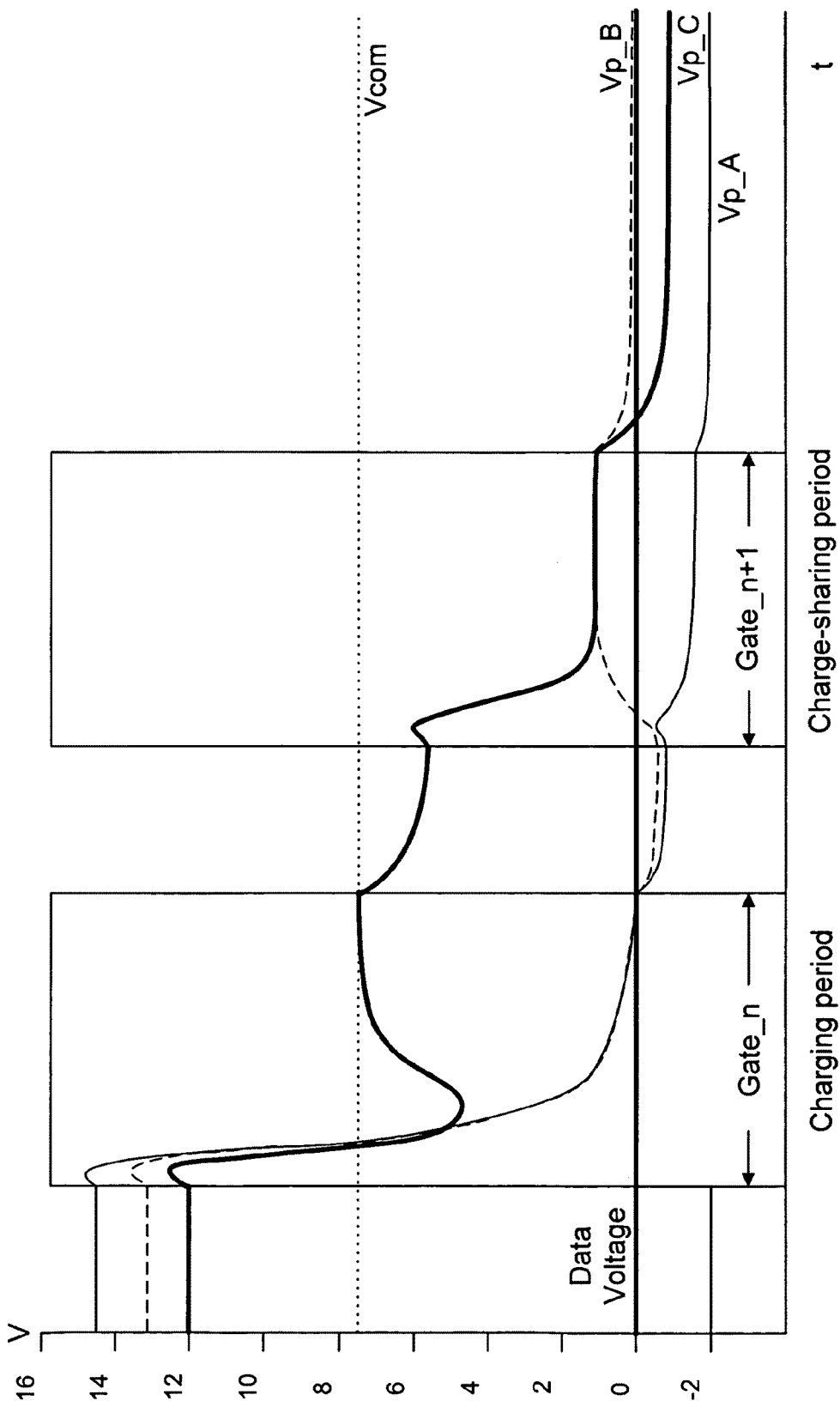
FIG. 10b shows a timing chart with various signals associated with a pixel in a negative charging, wherein the data line driving is according to a column inversion driving method.
Figure 12:
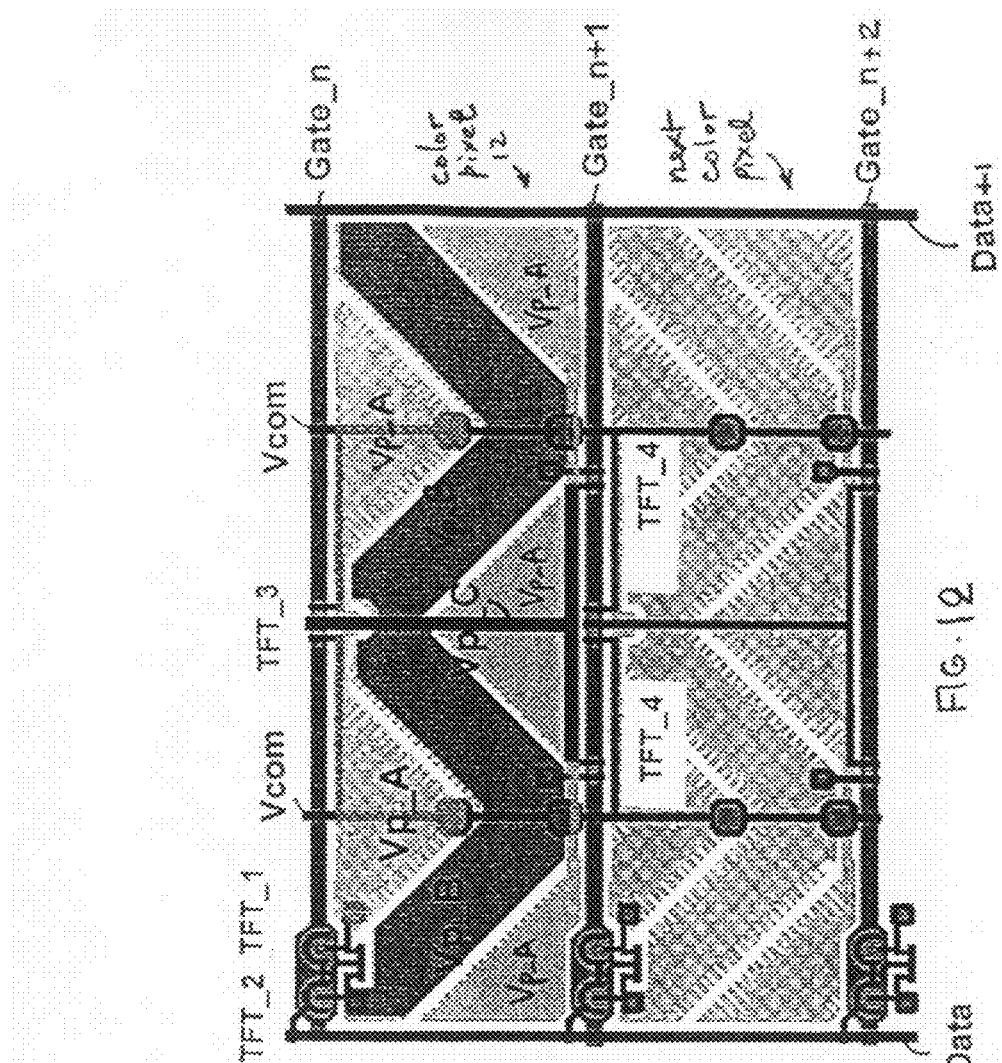
FIG. 12 shows the layout of a pixel, according to a different embodiment of the present invention.
Figure 11:
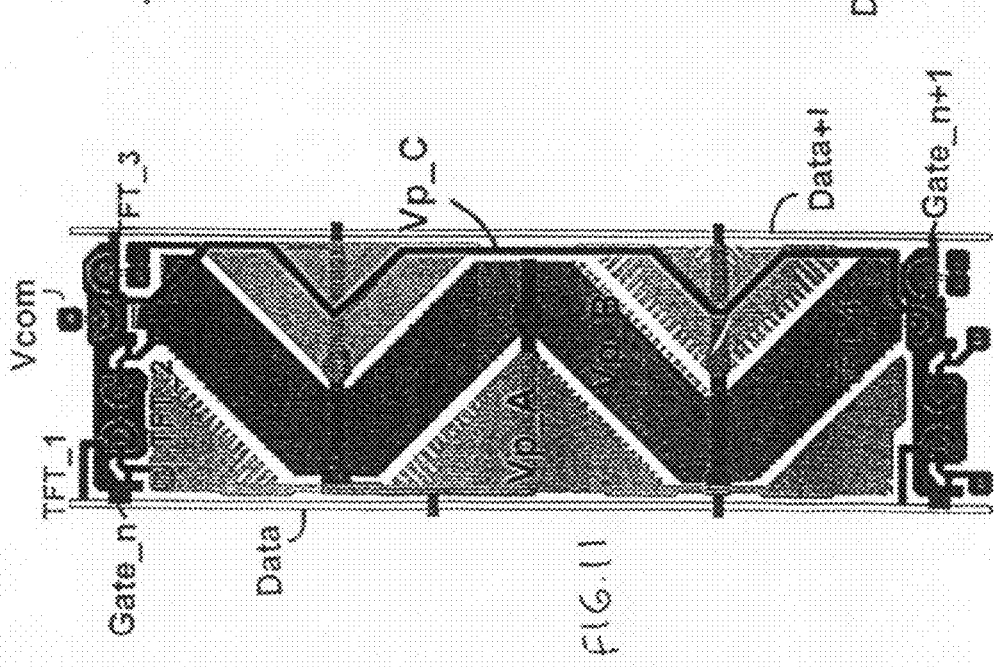
FIG. 11 shows a different layout of a pixel, according to another embodiment of the present invention.

The timing-charts as shown in FIGS. 6a and 6b show the data voltage level in a dot inversion driving method. In the dot inversion driving method, the data line voltage level is high in the charging period and low in the charge-sharing period in Frame N; the data line voltage is low in the charging period and high in the charge-sharing period in Frame N+1. It should be noted that the present invention is also applicable in a 2-line inversion driving method and in a column driving method. In positive charging accordance with the 2-line inversion driving method, the data line voltage is high during both the charging period and the charge-sharing period in Frame N, as shown in FIG. 9a. In negative charging accordance with the 2-line inversion driving method, the data line voltage is low during both the charging period and the charge-sharing period in Frame N+1, as shown in FIG. 9b. In positive charging accordance with the column inversion driving method, the data line voltage is high in Frame N, as shown in FIG. 10a. In negative charging accordance with the 2-line inversion driving method, the data line voltage is low in Frame N+1, as shown in FIG. 10b.

In sum, according to various embodiments of the present invention, the method for use in a liquid crystal display having a plurality of pixels comprises the steps of:

providing a first electrode in the first sub-pixel and a second electrode in the second sub-pixel; and providing a capacitor having a first capacitor end and a second capacitor end, the first capacitor end connected to the first electrode, wherein during the charging period:
electrically connecting the first and second electrodes to a data line having data line voltage level relative to a first voltage source;
electrically connecting the second capacitor end to a second voltage source, and during the charge-sharing period:
electrically disconnecting the first and second electrodes from the data line;
electrically disconnecting the second capacitor end from the second voltage source; and electrically connecting a second capacitor end to the second electrode, wherein the data line voltage level is higher or lower than the second voltage source in the charging period, such that a voltage potential on the first electrode relative to the first voltage source is higher or lower than a voltage potential on the second electrode relative to the first voltage source during the charge-sharing period.

The first voltage source and the second voltage are electrically connected to each other. The first electrode can be connected to the data line via a first switching element and the second electrode is connected to the data line via a second switching element, and the second capacitor end is connected to the second voltage source via a third switching element, each of the first, second and third switching elements operable in a conducting state and in a non-conducting state, and wherein during the charging period, each of the first, second and third switching elements is operated in the conducting state, and during the charge-sharing period, each of the first, second and third switching elements is operated in the non-conducting state. The second capacitor end can be connected to the second electrode via a fourth switching element operable in a conducting state and in a non-conducting state, and wherein during the charging period, the fourth switching element is operated in the non-conducting state and during the charge-sharing period, the fourth switching element is operated in the conducting state. Each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal. Each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal. Each of the first, second, third and fourth switching elements is operated in the non-conducting state in a time period subsequent to the charge-sharing period, and in the non-conducting state in a time period between the charging period and the charge-sharing period.

The liquid crystal display, according to various embodiments of the present invention, comprising: a first substrate, a second substrate; and a liquid crystal layer, disposed between the first and second substrates, for forming a plurality of pixels, at least some of the pixels having a first sub-pixel and a second sub-pixel, wherein each of said pixels comprises a charge sharing period subsequent to a charging period, and wherein the first sub-pixel comprises a first electrode located on the first substrate for applying a first voltage potential on the liquid crystal layer in the first sub-pixel relative to a first voltage level on the second substrate, and wherein the first electrode is electrically connected to a first end of a capacitor; and the second sub-pixel comprises a second electrode located on the first substrate for applying a second voltage potential on the liquid crystal layer in the second sub-pixel layer relative to the first voltage level, wherein during the charging period:
the first and second electrodes are electrically connected to a data line having a data line voltage level relative to the first voltage level;

a second end of the capacitor is electrically connected to a voltage source having a second voltage level; and during the charge-sharing period:
the first and second electrodes are electrically disconnected from the data line;
the second end of the capacitor is electrically disconnected from the voltage source; and
the second end of the capacitor is electrically connected to the second electrode, wherein the data line voltage level is higher or lower than the second voltage level during the charging period, such that the first voltage level is higher or lower than the second voltage level during the charge-sharing period.

The liquid crystal display further comprises a first switching element for electrically connecting the first electrode to the data line; a second switching element for electrically connecting the second electrode to the data line, a third switching element for electrically connecting the second end of the capacitor to the same or a different voltage source, wherein each of the first, second and third switching elements is operable in a conducting state and in a non-conducting state, and wherein during the charging period, each of the first, second and third switching elements is operated in the conducting state, and during the charge-sharing period, each of the first, second and third switching elements is operated in the non-conducting state; and a fourth switching element for electrically connecting the second end of the capacitor to the second electrode, the fourth switching operable in a conducting state and in a non-conducting state, wherein during the charging period, the fourth switching element is operated in the non-conducting state and during the charge-sharing period, the fourth switching element is operated in the conducting state.

According to one embodiment of the present invention, each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal. Each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal. Each of the first, second, third and fourth switching elements is adapted to operate in the non-conducting state in a time period subsequent to the charge-sharing period, and in the non-conducting state in a time period between the charging period and the charge-sharing period.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:
1. A method for use in a liquid crystal display having a plurality of pixels, wherein at least some of the pixels have a first sub-pixel and a second sub-pixel, and wherein each of said pixels comprises a charge sharing period subsequent to a charging period, said method comprising:
providing a first electrode in the first sub-pixel and a second electrode in the second sub-pixel; and providing a capacitor having a first capacitor end and a second capacitor end, the first capacitor end connected to the first electrode, wherein during the charging period:
electrically connecting the first and second electrodes to a data line having data line voltage level relative to a first voltage source;
electrically connecting the second capacitor end to a second voltage source, and during the charge-sharing period:
electrically disconnecting the first and second electrodes from the data line;
electrically disconnecting the second capacitor end from the second voltage source; and
electrically connecting the second capacitor end to the second electrode, wherein the data line voltage level is provided such that a voltage potential on the first electrode relative to the first voltage source is different from a voltage potential on the second electrode relative to the first voltage source during the charge-sharing period.

2. The method of claim 1, wherein the data line voltage level is higher than the second voltage source during the charging period such that the voltage potential on the first electrode relative to the first voltage source is higher than the voltage potential on the second electrode relative to the first voltage source during the charge-sharing period.

3. The method of claim 1, wherein the data line voltage level is lower than the second voltage source during the charging period such that the voltage potential on the first electrode relative to the first voltage source is lower than the voltage potential on the second electrode relative to the first voltage source during the charge-sharing period.

4. The method of claim 1, wherein the first voltage source and the second voltage source are electrically connected to each other.

5. The method of claim 1, wherein the first electrode is connected to the data line via a first switching element and the second electrode is connected to the data line via a second switching element, and the second capacitor end is connected to the second voltage source via a third switching element, each of the first, second and third switching elements operable in a conducting state and in a non-conducting state, and wherein during the charging period, each of the first, second and third switching elements is operated in the conducting state, and during the charge-sharing period, each of the first, second and third switching elements is operated in the non-conducting state.

6. The method of claim 5, wherein the second capacitor end is connected to the second electrode via a fourth switching element operable in a conducting state and in a non-conducting state, and wherein during the charging period, the fourth switching element is operated in the non-conducting state and during the charge-sharing period, the fourth switching element is operated in the conducting state.

7. The method of claim 6, wherein each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal.

8. The method of claim 7, wherein each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal.

9. The method of claim 8, wherein each of the first, second, third and fourth switching elements is operated in the non-conducting state in a time period subsequent to the charge-sharing period.

10. The method of claim 8, wherein each of the first, second, third and fourth switching elements is operated in the non-conducting state in a time period between the charging period and the charge-sharing period.

11. The method of claim 1, wherein each of said pixels is one of a plurality of color-sections of a color pixel.

12. The method of claim 11, wherein the color sections comprise a red, a blue and a green color section.

13. A liquid crystal display, comprising:
a first substrate,
a second substrate; and
a liquid crystal layer, disposed between the first and second substrates, for forming a plurality of pixels, at least some of the pixels having a first sub-pixel and a second sub-pixel, wherein each of said pixels comprises a charge sharing period subsequent to a charging period, and wherein the first sub-pixel comprises a first electrode located on the first substrate for applying a first voltage potential on the liquid crystal layer in the first sub-pixel relative to a first voltage level on the second substrate, and wherein the first electrode is electrically connected to a first end of a capacitor; and the second sub-pixel comprises a second electrode located on the first substrate for applying a second voltage potential on the liquid crystal layer in the second sub-pixel relative to the first voltage level, wherein during the charging period:
the first and second electrodes are electrically connected to a data line having a data line voltage level relative to the first voltage level;
a second end of the capacitor is electrically connected to a voltage source having a second voltage level; and during the charge-sharing period:
the first and second electrodes are electrically disconnected from the data line;
the second end of the capacitor is electrically disconnected from the voltage source; and
the second end of the capacitor is electrically connected to the second electrode, wherein the data line voltage level is provided such that the first voltage level is different from the second voltage level during the charge-sharing period.

14. The liquid crystal display of claim 13, wherein the data line voltage level is higher than the second voltage source during the charging period such that the voltage potential on the first electrode relative to the first voltage source is higher than the voltage potential on the second electrode relative to the first voltage source during the charge-sharing period.

15. The liquid crystal display of claim 13, wherein the data line voltage level is lower than the second voltage source during the charging period such that the voltage potential on the first electrode relative to the first voltage source is lower than the voltage potential on the second electrode relative to the first voltage source during the charge-sharing period.

16. The liquid crystal display of claim 13, wherein the first voltage level is substantially equal to the second voltage level.

17. The liquid crystal display of claim 13, further comprising:
a first switching element for electrically connecting the first electrode to the data line;

a second switching element for electrically connecting the second electrode to the data line, and a third switching element for electrically connecting the second end of the capacitor to the voltage source, wherein each of the first, second and third switching elements is operable in a conducting state and in a non-conducting state, and wherein during the charging period, each of the first, second and third switching elements is operated in the conducting state, and during the charge-sharing period, each of the first, second and third switching elements is operated in the non-conducting state.

18. The liquid crystal display of claim 17, further comprising:

a fourth switching element for electrically connecting the second end of the capacitor to the second electrode, the fourth switching operable in a conducting state and in a non-conducting state, wherein during the charging period, the fourth switching element is operated in the non-conducting state and during the charge-sharing period, the fourth switching element is operated in the conducting state.

19. The liquid crystal display of claim 18, wherein each of said pixels comprises a first gate line for providing a first gate signal during the charging period, and wherein each of the first, second and third switching elements comprises a transistor having a gate terminal connected to the gate line so that each of the first, second and third switching elements is caused to operate in the conducting state by the gate signal.

20. The liquid crystal display of claim 19, wherein each of said pixels further comprises a second gate line for providing a second gate signal during the charge sharing period, and wherein the fourth switching element comprises a further transistor having a gate terminal connected to the second gate line so that the fourth switching element is caused to operate in the conducting state by the second gate signal.

21. The liquid crystal display of claim 20, wherein each of the first, second, third and fourth switching elements is adapted to operate in the non-conducting state in a time period subsequent to the charge-sharing period.

22. The liquid crystal display of claim 20, wherein each of the first, second, third and fourth switching elements is adapted to operate in the non-conducting state in a time period between the charging period and the charge-sharing period.

23. The liquid crystal display of claim 13, wherein each of said pixels is one of a plurality of color-sections of a color pixel.

24. The liquid crystal display of claim 23, wherein the color sections comprise a red, a blue and a green color section.

* * * * *